United States Patent [19]
Saijo et al.

[11] Patent Number: 4,803,505
[45] Date of Patent: Feb. 7, 1989

[54] MICROFILM CAMERA

[75] Inventors: Takao Saijo, Tama; Masafumi Fujita, Kawasaki, both of Japan

[73] Assignee: Minolta Camera Kabushiki Kaisha, Osaka, Japan

[21] Appl. No.: 91,987

[22] Filed: Sep. 1, 1987

[30] Foreign Application Priority Data

Sep. 3, 1986 [JP] Japan .................................. 61-207059
Sep. 3, 1986 [JP] Japan .................................. 61-207060

[51] Int. Cl.⁴ .............................................. G03B 29/00
[52] U.S. Cl. ......................................... 354/80; 355/74; 355/64
[58] Field of Search ................. 354/105, 80, 159; 355/28, 29, 41, 64, 71, 74, 50

[56] References Cited

U.S. PATENT DOCUMENTS

| 2,371,542 | 3/1945 | Place ........................................ 355/64 |
| 3,744,890 | 7/1973 | Suzuki et al. ....................... 353/26 R |
| 3,885,866 | 5/1975 | Stearns ............................... 355/41 X |
| 4,693,591 | 9/1987 | Saijo et al. .............................. 355/41 |
| 4,701,046 | 10/1987 | Shiga ................................. 355/74 X |

FOREIGN PATENT DOCUMENTS 50-53050 5/1975 Japan .
59-30550 2/1984 Japan .
59-83131 5/1984 Japan .

Primary Examiner—L. T. Hix
Assistant Examiner—Brian W. Brown
Attorney, Agent, or Firm—Burns, Doane, Swecker & Mathis

[57] ABSTRACT

A camera comprising a document table for placing a document thereon, a photographing assembly for photographing the document on the table on a film on a reduced scale, and a marking assembly for photographing on the film a size mark corresponding to the size of the photographed image. When documents of different sizes are photographed on the same reduced scale by the photographing assembly, the corresponding size mark provided by the marking assembly is also photographed on the film in the vicinity of each film image. Such size marks recorded serve as image size data when the film images are thereafter copied by a reader-printer or printer on an enlarged scale, and are useful for automatically selecting copy paper of suitable size.

11 Claims, 15 Drawing Sheets

MICROFILM CAMERA

BACKGROUND OF THE INVENTION

1. Field of the Invention

The present invention relates to a microfilm camera for photographing images of documents on a film on a reduced scale to prepare a microfilm, and more particularly to a microfilm camera of the type for photographing documents of different sizes, such as A3 and A4 sizes of JIS standards, on a film on the same reduced scale.

2. Description of Related Art

Unexamined Japanese Patent Publication No. SHO 59-83131 discloses a known microfilm camera of this type.

The disclosed camera is adapted to detect the size of the document to be photographed, adjust the aperture size of its photographing assembly according to the document size detected and control the feed of film in conformity with the document size. The camera has the advantage that documents of different sizes can be photographed easily, each in accordance with its size.

However, when the images photographed on the film by the disclosed microfilm camera are to be copied, for example, by a reader-printer, or the like, on the same enlarged scale, there arises a need to judge the size of each image on the film and to select and feed copy paper of A3, A4 or other size suited to the image size.

The image size is usually judged by the operator by observing the image on the film, or it is detected from the film image using many sensors as disclosed in Unexamined Japanese Patent Publication No. SHO 59-30550. Accordingly, the judging or detecting procedure is cumbersome, involves errors or requires a device which is complex in construction and inefficient.

SUMMARY OF THE INVENTION

An object of the present invention is to provide a microfilm camera which is adapted to photograph images of documents on a film on a reduced scale and to photograph a size mark corresponding to the size of the document also on the film in the vicinity of each image thereon, so that the size of the original image corresponding to the photographed image can be thereafter judged from the size mark easily and reliably.

Another object of the invention is to provide a microfilm camera which is adapted to photograph the size mark easily by simple means.

Another object of the invention is to provide a microfilm camera which is adapted to photograph the size mark simply by specifying the document size manually.

Another object of the invention is to provide a microfilm camera which is adapted to photograph the size mark by automatically specifying the document size upon detecting the document size, the camera thus being made easier to use.

Another object of the invention is to provide a microfilm camera wherein a particular kind of size mark is selected together with, or according to, the aperture size to be selected for the desired document size for restricting the area of a film to be exposed for photographing the document.

Other objects and features of the invention will become apparent from the following description with reference to the accompanying drawings.

BRIEF DESCRIPTION OF THE DRAWINGS

Throughout the drawings, like parts are designated by like reference numerals and will not be described repeatedly.

DETAILED DESCRIPTION OF THE PREFERRED EMBODIMENTS

Embodiments of the invention will be described below with reference to the drawings.

Figure 1:
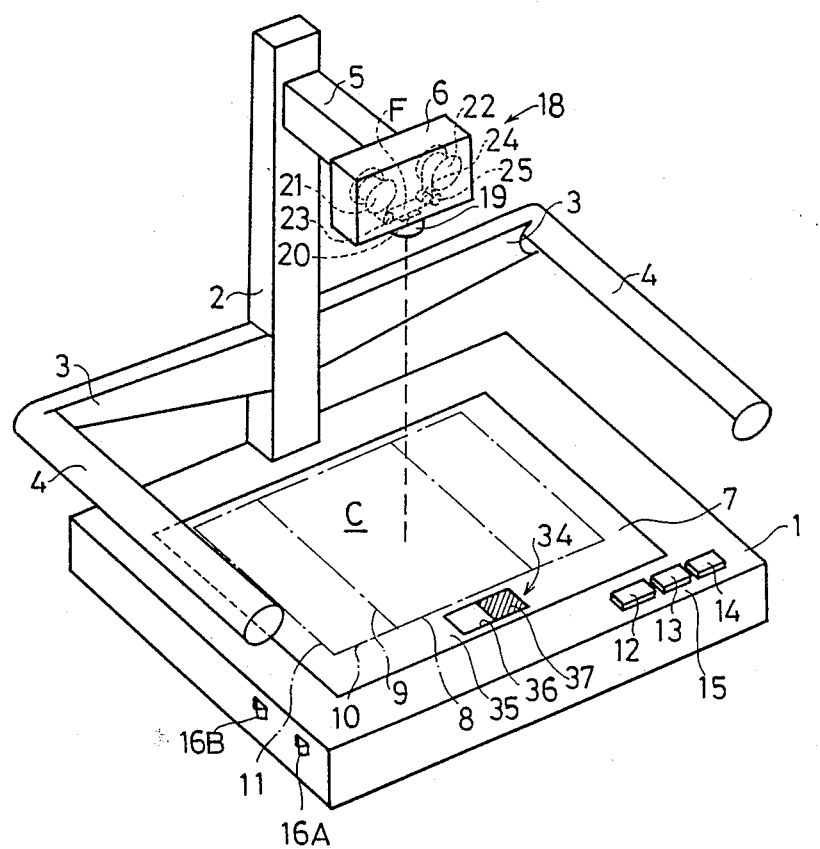
FIG. 1 is an overall perspective view showing a microfilm camera, i.e., a first embodiment of the invention.

FIG. 1 schematically shows a microfilm camera which embodies the invention and in which documents are manually placed in position.

A base 1 in the form of a seat is generally rectangular when seen from above and has on its upper side a document table 7 similar to the base 1. In the rear of the document table 7 at the midportion of the length of the base 1, an upright post 2 is fixed to the base 1. The post 2 has arms 3, 3 extending rightward and leftward from its base portion. Each arm 3 has an illumination lamp 4 extending forward from its free end. The document table 7 is illuminated by the lamps 4, 4 obliquely from above at the right and left sides of the table.

A camera head 6 is fixedly mounted on an arm extending forward from an upper end portion of the fixed post 2 so as to be positioned above the center of the document table 7.

The surface of the document table 7 is marked with lines 8 and 9 in X direction and Y direction, respectively, for positioning a document C, for example, of A4 size according to JIS standards, centrally of the table. The table 7 is also marked with lines 10 and 11 in X and Y directions for similarly positioning a document C of A3 size.

Accordingly, when the document C is placed on the table 7 along the lines 8, 9 or line 10, 11 corresponding to its size, the document C can be positioned on the table 7 as specified in a specified orientation, with the center line of the document aligned with the center line of the table 7, irrespective of the size of the document.

The document C need not always be positioned centrally of the table. For example, one edge thereof may be positioned in coincidence with a fixed position on the table 7.

In front of the document table 7, the base 1 is provided close to its front right corner with an A4-size button 12, a space button 13 for idly transporting a film F loaded in the camera head 6, and an A3-size button 14. These buttons are arranged in a row.

The A4-size button 12 and the A3-size button 14 constitute size specifying means 15 for specifying the size of an aperture 20 for restricting the area of the film F to be exposed for photography, i.e. the aperture size required for photographing the document C of A4 or A3 size on a specified reduced scale. The operator judges the size of image to be photographed for every document C and depresses the corresponding one of the buttons 12 or 14, whereby the proper size of aperture 20 is specified.

Consequently, both the A4 document and A3 document can be photographed on the film F over areas of different sizes on the same reduced scale. Moreover, the entire document C of A3 size or an A4-size portion thereof, for example, can be photographed as desired.

The size of the aperture 20, which is manually specified in the present embodiment, may alternatively be automatically specified based on the document size detected by a sensor mounted on the document table 7.

At a front portion of the document table 7 other than the area thereof for supporting documents C of A4 and A3 sizes, there is provided a marking assembly 34 for photographing size marks and a blip mark for retrieving a particular kind or group of photographed images or a particular frame. Further provided on one side of the base 1 are a selection switch 16A for selectively specifying the use of the marking assembly 34 for photographing the size mark or for photographing the blip mark for the retrieval of a desired kind or group of photographed images or a desired frame, and a selection switch 16B for entering an input as to whether the mark is to be photographed by the marking assembly.

The camera head 6 has a photographing assembly 18. The photographing assembly 18 includes a lens 19 fitted in a bottom opening in the closed camera head 6, an unillustrated shutter in the rear of the lens, and the aperture 20 in the rear of the shutter. An image of the document C on the table 7 is photographed on the film F loaded behind the aperture, through the lens 19 and the aperture 20.

Within the camera head 6, the unexposed portion of the film F is paid off from a supply reel 21 and intermittently transported, by a specified amount at a time, toward a take-up reel 22 by being passed over a guide roller 23, a drivingly rotated film feed roller 24 and a driven roller 25 in pressing contact with the feed roller 24, while being positioned along the rear side of the aperture 20. The amount of feed of the film F is calculated from the size of aperture 20 for photographing the previous image and the aperture size for the image to be photographed currently (current image).

Figure 2:
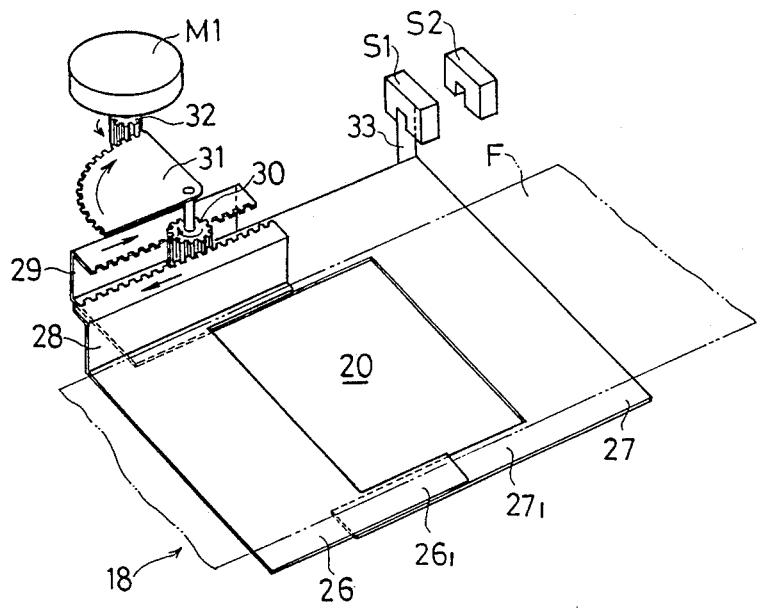
FIG. 2 is a perspective view showing an aperture mechanism included in the camera head for giving a variable aperture size according to the size of document to be photographed.

For example as seen in FIG. 2, the aperture 20 is formed by a pair of light blocking plates 26, 27 provided within the camera head 6 and having bifurcated portions 26', 27' which are lapped over each other as oriented in opposite directions. The light blocking plates 26, 27 respectively have racks 28, 29 opposed to each other and meshing with a pinion 30 interposed therebetween. The forward or reverse rotation of the pinion 30 moves the blocking plates 26, 27 away from or toward each other along the direction of feed of the film F, increasing or decreasing the size of the aperture 20 in the film feed direction. The pinion 30 is rotated forward or reversely by a reversible motor M1 by way of a sector gear 31 mounted on the same shaft as the pinion 30 and a drive gear 32 meshing with the sector gear.

At one corner of the light blocking plate 26, a detection plate 33 is formed by bending. The detection plate 33 can be detected by one of sensors S1 and S2 arranged side by side. For example when a photographing area of A4 size is specified by the A4-size button 12, the motor M1 is so controlled as to bring the plates 26, 27 to such a position that the detection plate 33 is detected by the sensor S1, consequently forming an aperture size corresponding to A4 size. Further when a photographing area of A3 size is specified by the A3-size button 14, the light blocking plates 26, 27 are brought to a position where the detection plate 33 is detected by the sensor S2, by the controlled operation of the motor M1, thereby forming an aperture size corresponding to A3 size.

Although the photographing assembly 18 of the present embodiment has been described for use with the film F which is a roll film, the assembly 18 is not limitative; a photographing assembly for a microfiche film is also usable according to the invention.

Figure 3:
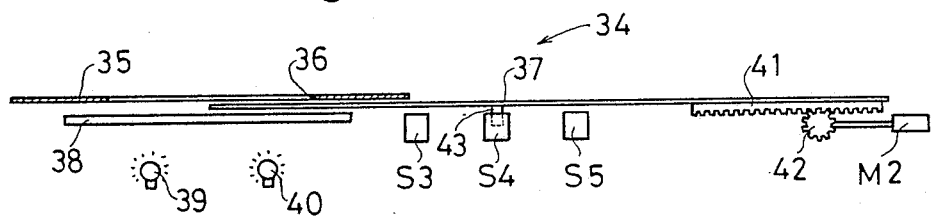
FIG. 3 is a sectional view showing a marking assembly mounted on a base.

With reference to FIGS. 1 and 3, the marking assembly 34 comprises a light blocking frame plate 35 provided around the document supporting area of the document table 7 and formed with an opening 36, a light blocking shutter 37 for entirely closing the opening 36 or opening the opening 36 to an adjusted degree in the direction of feed of the film F from inside the base 1, a light diffuser plate 38 disposed under the shutter 37 and opposed to the opening 36, and first and second mark lamps 39, 40 provided under the diffuser plate 38 and opposed to the left and right halves of the opening 36, respectively. The light from the mark lamps 39, 40 is diffused by the plate 38 to uniformly illuminate the entire area of the opening 36 from below.

Figure 4:
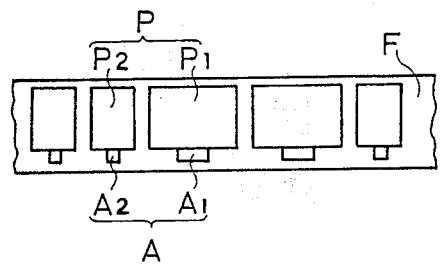
FIG. 4 is a plan view showing a film bearing size marks photographed thereon.

The difference in the degree to which the opening 36 is opened in the direction of feed of the film F, i.e., whether the opening 36 is closed with the shutter 37 over one-half thereof as seen in FIGS. 1 and 3 or fully opened, provides distinguishable optical mark sources. When a film image P1 of the A4 document or a film image P2 of the A3 document is formed on the film F, either mark source is photographed at the same time on the film in the vicinity of the image P1 or P2 in corresponding relation to the size of the image P1 or P2 as seen in FIG. 4. Thus, size marks A are formed for document images P on the film.

The shutter 37 is fixedly provided at its one end with a rack 41 which is in mesh with a pinion 42 fixed to the shaft of a reversible second motor M2. Accordingly, the forward or reverse rotation of the motor M2 moves the shutter 37 relative to the opening 36, opening the opening 36 or adjustedly closing the opening.

The shutter 37 is centrally provided with a mark plate 43 which is detactable by one of sensors S3, S4 and S5. These sensors S3 to S5 detect the position of the shutter 37, whether the size mark A is to be photographed, and the length of size mark A to be photographed. Stated more specifically, the motor M2 is so controlled as to place the shutter 37 in one of the following positions. When no size mark A is to be photographed, the shutter 37 is brought to a position where the mark plate 43 is detected by the sensor S3, whereby the opening 36 is entirely closed with the shutter 37. When the photographing area of A4 size is specified by the A4-size button 12, the shutter 37 is brought to a position where the mark plate 43 is detected by the sensor S4, closing one half of the opening 36. When the photographing area of A3 size is specified by the A3-size button 14, the shutter 37 is brought to a position where the mark plate 43 is detected by the sensor S5, fully opening the opening 36.

Figure 5:
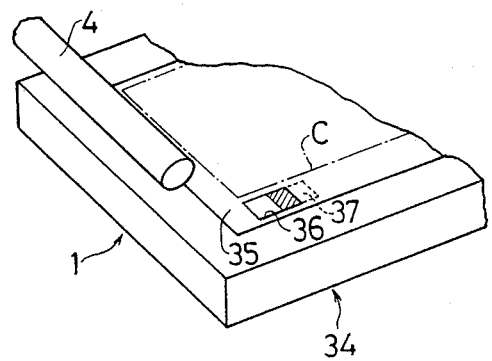
FIG. 5 is a fragmentary perspective view showing a modification of the first embodiment having an altered position for photographing marks.
Figure 6:
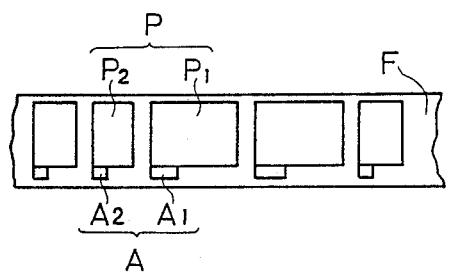
FIG. 6 is a plan view showing a film bearing marks photographed thereon by the modification of FIG. 5.

Although the size mark A is formed immediately adjacent to the midportion of one side of the photographed image P on the film F as seen in FIG. 4 according to the present embodiment, the position of the mark is not limitative. As shown in FIG. 5, for example, the opening 36 of the marking assembly 34 may be provided at the left end of the document table 7 to form the size mark A at one end of one side of the photographed image P on the film F as seen in FIG. 6.

While the marking assembly 34 of the present embodiment includes the mechanical shutter 37 to provide optical mark sources, the marking assembly is not limitative either. For example, a liquid crystal shutter which is variable in light transmittance with the voltage applied thereto is usable as divided into two areas. Also usable is a device having a light-emitting surface, such as a light-emitting diode, to serve as an optical mark source having two divided areas. Thus, various means are usable.

Although one of the two mark sources of different sizes for two different document sizes is selectively used in the present embodiment, the invention is not limited to these mark sizes. Whatever marking means may be employed, it is possible to use at least three mark sizes, e.g., large, medium and small sizes.

Figure 7:
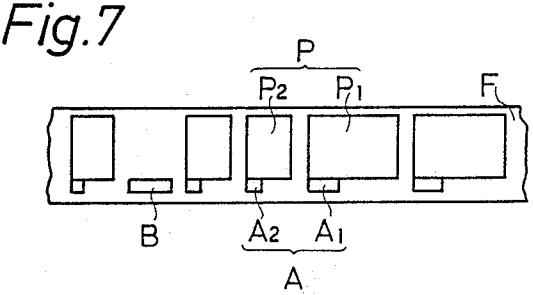
FIG. 7 is a plan view showing a film bearing size marks and an image retrieval blip mark photographed thereon by another modification of the first embodiment.

When three different mark sizes are to be used the marks of medium and small sizes are usable as size marks A1 and A2 for the photographed images P1 and P2 on the film, and the mark of large size, such as a blip mark B, is usable for retrieving a particular kind or group of photographed documents C. The blip mark B is advantageously distinguishable if photographed in a space bearing no image of document C after idly transporting the film F, before photographing a different kind of document C as shown in FIG. 7. The blank space is obtained by depressing the space button 13.

Figure 8:
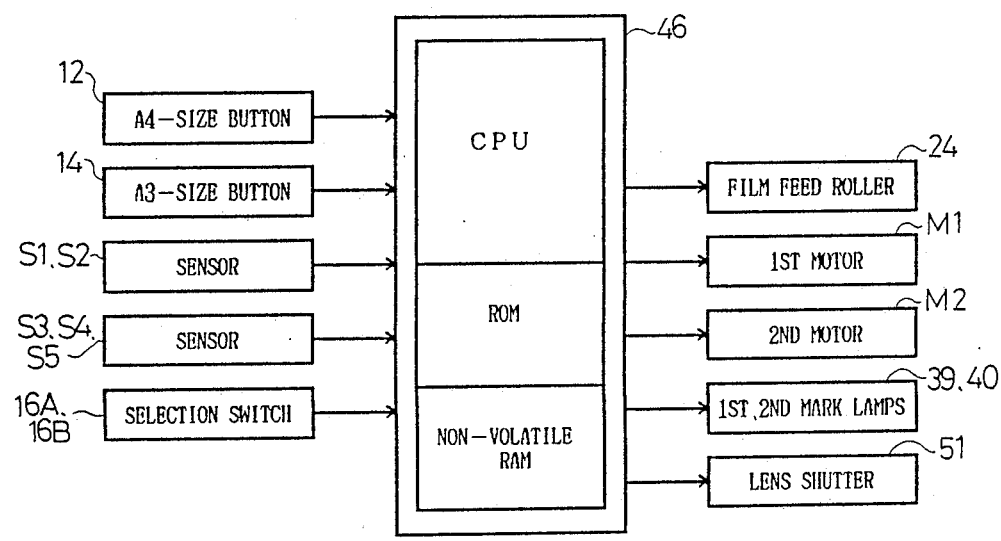
FIG. 8 is a block diagram showing wiring between external devices and a microcompuer serving as the control means of the first embodiment.

The operation control means of the present embodiment will be described next, which comprises a microcomputer 46 generally in use for operation control. With reference to FIG. 8, the microcomputer 46 comprises a CPU in combination with a ROM and a non-volatile RAM. The CPU has connected to its input ports operation control signal sources including input means, such as the A4-size button 12, the A3-size button 14 and the selection switches 16A, 16B, and sensor means, such as sensors S1 to S5. Connected to the output ports of the CPU are operation means such as the film feed roller 24, the motors M1, M2, the mark lamps 39, 40 and a lens shutter 51.

The operation of these operation means is controlled according to the signals from the input means and sensor means mentioned above.

The process for operation control will be described below with reference to the flow charts of FIGS. 9 to 12.

Figure 9:
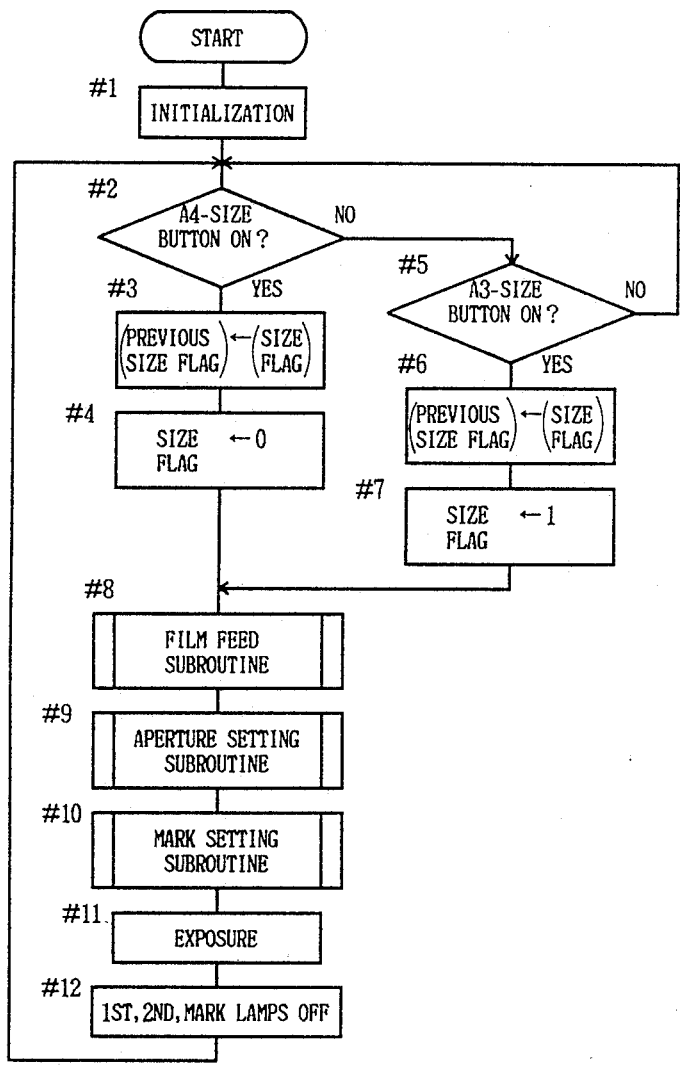
FIG. 9 is a main flow chart showing the operation control process to be executed by the control means of FIG. 8.

FIG. 9 shows the main routine which includes, for example, a control procedure for determining the amount of feed of the film F by storing the existing size flag as the preceding size flag and comparing the size flag with a size flag for current operation, to use the marking assembly 34 for photographing the size mark A.

The initialization of step 1 includes initialization of the microcomputer 46 and resetting of various flags. Subsequently, a document C is positioned on the document table 7. The desired size is specified by the size specifying means 15 in steps 2 and 5. Step 2 checks whether the A4-size button 12 is on. If it is on, step 3 follows, in which the existing size flag is stored in the non-volatile RAM as the preceding size flag, and a new size flag is set up for the current use. The status thereof is then set to 0 in step 4.

When the answer to the inquiry of step 2 is negative, step 5 follows which checks whether the A3-size button 14 is on. If it is not on, the sequence returns to step 2, whereas if it is on, step 6 follows to store the existing size flag in the non-volatile RAM as the preceding size flag and set a new size flag for current use. The status thereof is then set to 1 in step 7.

The sequence thereafter proceeds to the subroutine of step 8 to feed the film F and to the subroutine of step 9 to set the aperture 20 to the specified size, followed by the mark setting subroutine of step 10. The film is exposed to light in step 11, and the first and second mark lamps 39, 40 are turned off in step 12. The sequence then returns to step 2.

According to the present embodiment, the amount of feed of the film is determined with reference to the existing flag which is stored in the non-volatile RAM and recognized as the previous size flag. Although this assures accurate and efficient control, this mode of control is not limitative. Since the aperture size indicates the previous photographing size, the previous size flag can be set based on the aperture size detected by the sensor S1 or S2.

Next, the subroutines in the main routine of FIG. 9 will be described.

Figure 10:
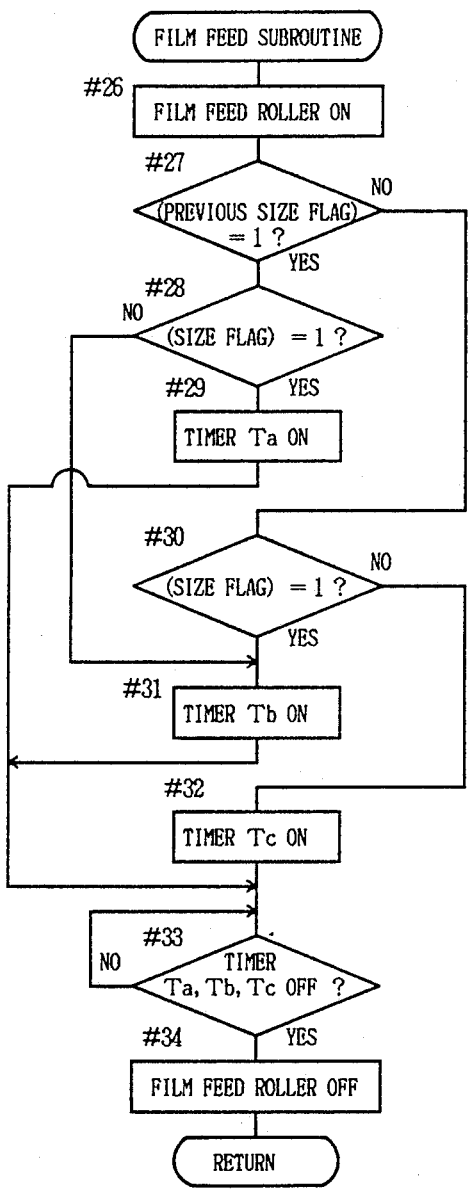
FIG. 10 is a flow chart showing the film feed subroutine of FIG. 9.

The film feed subroutine of step 8 in FIG. 9 is shown in FIG. 10.

Figure 13:
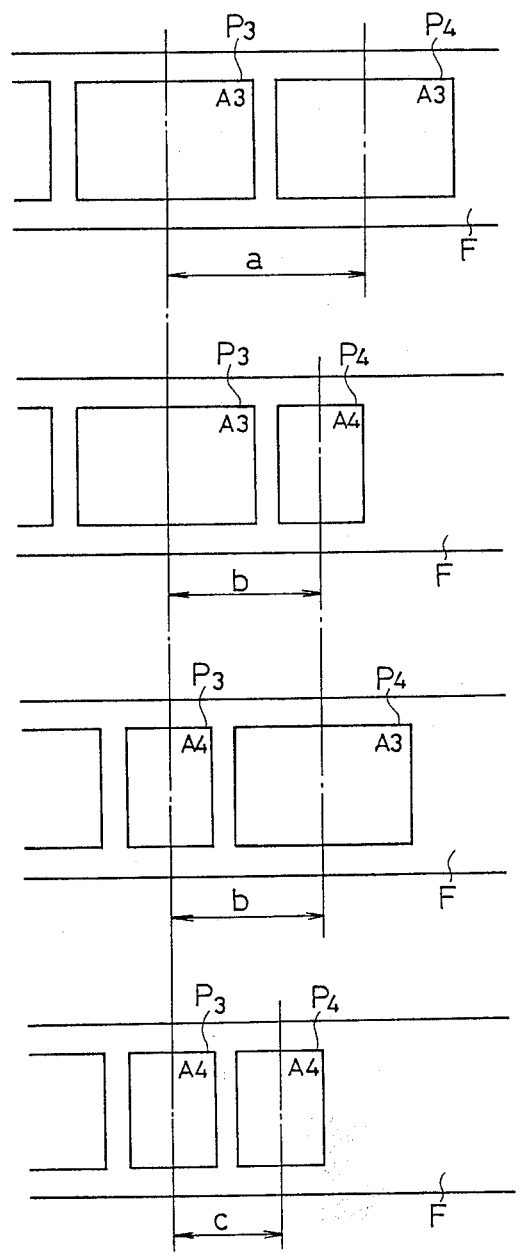
FIG. 13 includes plan views of films for illustrating differences in the amount of feed of film due to the relation in size between the image previously photographed and the image to be photographed currently.

As shown in FIG. 13, the amount of feed of the film F for photographing the next document is dependent on the relation in size between the film image P3 previously photographed and the film image P4 to be photographed currently. In the case where there are two different document sizes, the film is to be transported by an amount a, b or c. Accordingly, the film feed roller 24 is operated for time intervals corresponding to these amounts of feed a, b and c under the control of timers Ta, Tb and Tc which are different in setting time.

Stated more specifically, the film feed roller 24 is rotated at a predetermined speed by an unillustrated drive source in step 26. Step 27 checks the previous size flag of the aperture 20 in the memory as to whether the 20 status is 1. If it is 1, i.e. A3, step 28 checks the current size flag of the aperture 20 as to whether the status is 1. When it is 1, i.e. A3, the timer Ta is actuated for the time period set thereon.

Further when the previous size flag is found to be 0, i.e., A4, in step 27 and when the current size flag of the aperture 20 is found to be 1, i.e., A3, in step 30, the corresponding timer Tb is turned on for the specified time period in step 31. When step 28 detects that the current size flag is not 1 but 0, i.e., A4, step 31 similarly follows to actuate the timer Tb. If step 30 finds that the current size flag is not 1 but 0, i.e. A4, the corresponding timer Tc is actuated for the specified time interval in step 32.

When the timer Ta, Tb or Tc is found to be off in step 33 upon lapse of the set time interval, step 34 follows to stop the film feed roller 24.

Consequently, the film F is sent forward by the selected amount a, b or c required for photographing the current document and determined from the relation in size between the film image P3 previously photographed and the film image P4 to be currently photographed, whereupon the film is brought to a halt.

Thus, the amount of feed of the film F is determined by the operation time of the feed roller 24 which is controlled by a timer in this embodiment, whereas this method is not limitative. For example, the film feed roller 24 may be driven by a pulse motor to feed the film F by the specified amount a, b or c by controlling the amount of rotation of the pulse motor.

Figure 11:
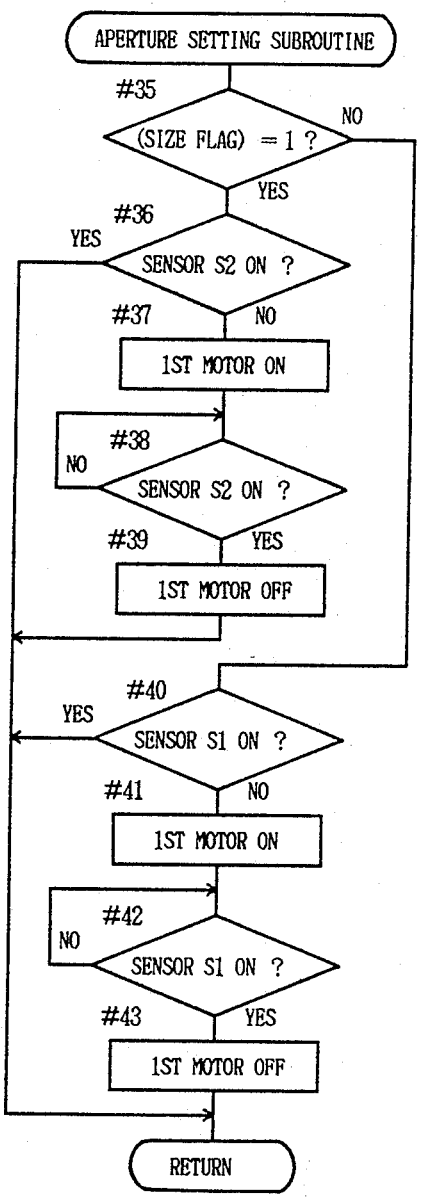
FIG. 11 is a flow chart showing the aperture setting subroutine of FIG. 9.

The aperture setting subroutine of step 9 in FIG. 9 is shown in FIG. 11.

This subroutine checks whether the size specified by the size specifying means 15 corresponds to the size of the aperture 20 which determines the size of the film image P to be photographed. If not in corresponding relation, adjustment is made to assure the correspondence.

First, step 35 determines whether the status of the size flag is 1. If the answer is in the affirmative, i.e., A3, step 36 follows wherein the detection plate 33 is positioned as detected by the sensor S2 because the previous photographing size is A3. This indicates that the aperture 20 is set properly for A3. The sequence therefore returns. When the answer to the inquiry of step 36 indicates that the detection plate 33 is not detected by the sensor S2, the first motor M1 is rotated counterclockwise in step 37, causing the drive gear 32, sector gear 31, pinion 30 and racks 28, 29 to move the light blocking plates 26, 27 away from each other. Upon the sensor S2 detecting the plate 33 in step 38, step 39 stops the motor M1. Thus, the aperture 20 is set to A3, and the sequence returns.

If step 35 reveals that the size flag is not 1 and is A4, step 40 follows, in which when the detection plate 33 is positioned as detected by the sensor S1 because the previous photographing size is A4. This indicates that the aperture 20 is set properly for A4, whereupon the sequence returns. If step 40 shows that the plate 33 is not detected by the sensor S1, the first motor M1 is rotated clockwise to move the light blocking plates 26, 27 toward each other. Upon the sensor S1 detecting the plate 33 in step 42, the first motor M1 is halted in step 43. In this way, the aperture 20 is set to A4, whereupon the sequence returns.

Figure 12:
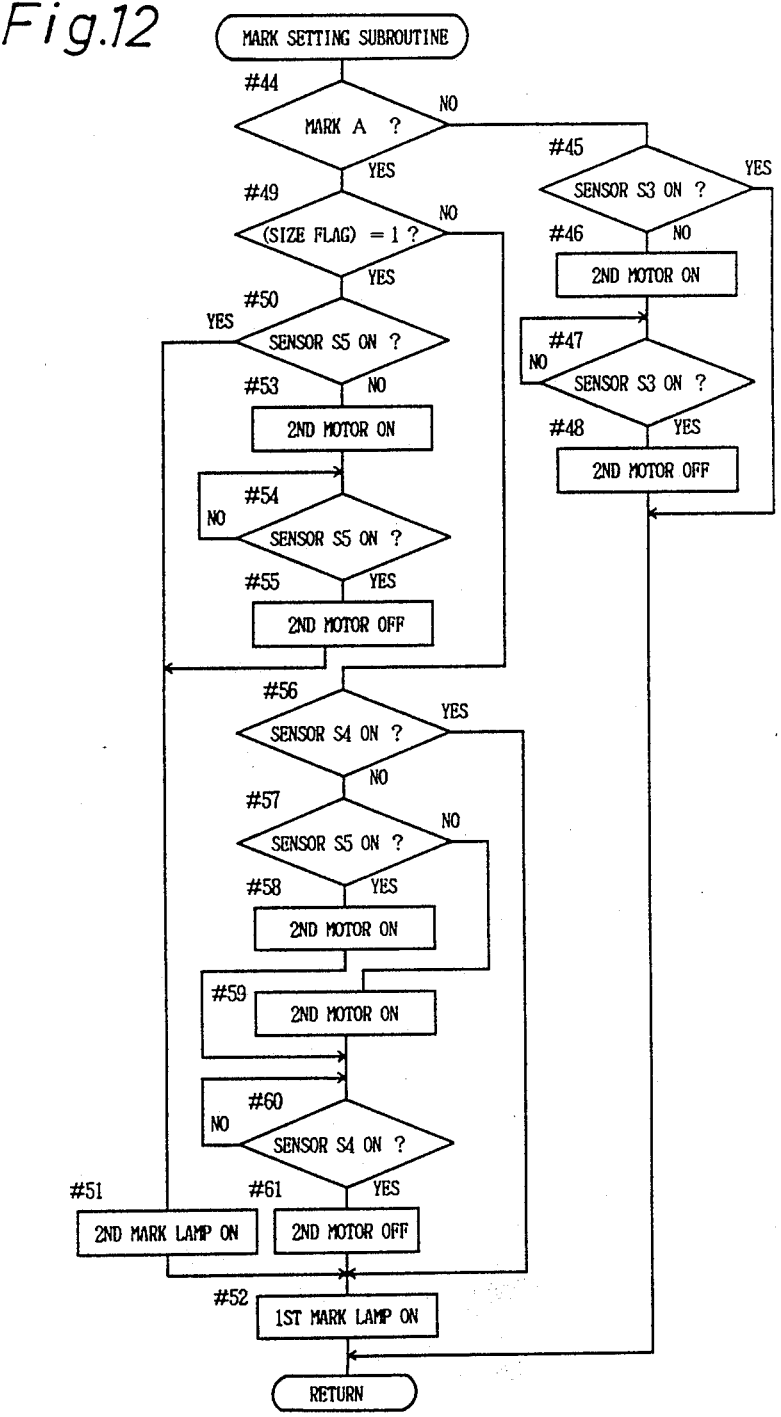
FIG. 12 is a flow chart showing the mark setting subroutine of FIG. 9.

The mark setting subroutine of step 10 in FIG. 9 is shown in FIG. 12.

This subroutine checks whether the size specified by the size specifying means 15 corresponds to the position of the shutter 37 which determines, for example, the length of the size mark A. If not in corresponding relation, the shutter 37 is moved to assure the correspondence.

First, step 44 checks whether the selection switch 16B is on or off to inquire whether the size mark A needs to be photographed. When no marking is needed, step 45 determines whether the mark plate 43 is detected by the sensor S3. If the answer is affirmative, indicating that the opening 36 is entirely closed with the shutter 37, the sequence returns. If the answer to the inquiry of step 45 is negative, the second motor M2 is rotated clockwise in step 46, causing the pinion 42 and the rack 41 to move the shutter 37 leftward in FIG. 3. Upon the sensor S3 detecting the mark plate 43 in step 47, the second motor M2 is deenergized in step 48. In this way, the opening 36 is completely closed with the shutter 37, permitting no size mark A to be photographed, whereupon the sequence returns.

When step 44 finds it, necessary to photograph the size mark A, step 49 determines whether the status of the size flag is 1. If it is 1, i.e., A3, step 50 checks whether the mark plate 43 is detected by the sensor S5. The sensor S5, if on, indicates that the shutter 37 is in its retracted position, leaving the opening 36 fully open as set for photographing the size mark A for A3. The second and first mark lamps 40 and 39 are then turned on in steps 51, 52, whereupon the sequence returns. When step 50 reveals that the mark plate 43 is not detected by the sensor S5, the second motor M2 is rotated counterclockwise in step 53, moving the shutter 37 rightward in FIG. 3. Upon the sensor S5 detecting the mark plate 43 in step 54, the second motor M2 is deenergized in step 55. In this way, the opening 36 is fully opened for A3 size, whereupon the second and first mark lamps 40, 39 are turned on in steps 51, 52. The sequence then returns.

If step 49 indicates that the size flag is not 1, representing A4 size, step 56 inquires whether the mark plate 43 is detected by the sensor S4. If the answer is in the affirmative, the shutter 37 is in an intermediate position, leaving the opening 36 half-open as set for photographing the size mark A for A4. The first lamp 39 is then turned on in step 52, whereupon the sequence returns. When the sensor S4 is found to be off in step 56, step 57 checks whether the mark plate 43 is detected by the sensor S5. If the sensor S5 is on, the second motor M2 is rotated clockwise in step 58, moving the shutter 37 leftward in FIG. 3. Thus, the shutter 37 is shifted from its retracted position for A3 to the intermediate position for A4.

Conversely, if the sensor S5 is found to be off in step 57, the second motor M2 is rotated counterclockwise in step 59 to move the shutter rightward in FIG. 3, opening one half of the opening 36 for A4 size. When the mark plate 43 is consequently detected by the sensor S4 in step 60, the second motor M2 is stopped in step 61.

The shutter 37 is half-open, leaving one half of the opening 36 open as set for photographing the A4 size mark A, whereupon the first mark lamp 39 is turned on in step 52. The sequence then returns.

In step 11 of FIG. 9, the document is photographed by the photographing assembly 18. More specifically, while the lens shutter is open for a predetermined time interval, all or part of the document C is projected onto the film F as an image P through the aperture 20 set to the specified size, by virtue of the light from the illumination lamps 4, 4 turned on. Further the size mark A as set by the foregoing procedure is photographed on the film by virtue of the first mark lamp 39 alone or together with second mark lamp 40.

Step 12 of FIG. 9 thereafter follows to turn off the first mark lamp 39, or the first and second lamps 39, 40. The sequence then returns to step 2 of FIG. 9, rendering the camera ready for the subsequent depression of the A4-size button 12 or A3-size button 14 for photographing the next document.

In this way, the size mark A corresponding to the size of the document C or of the film image P is easily photographed on the film F in the vicinity of the photographed image P.

When such film images P are to be thereafter copied on the same enlarged scale by a reader-printer, printer or the like, the size of each film image P or the document concerned can be easily detected or judged.

For example, the size mark A is easily detectable by sensor means, such as a channel sensor, which is opposed to the channel portion of the film F and positioned in the path of projection of light at the roll film carrier portion of a reader-printer. This size mark thus detected readily indicates the size of the film image P or document C concerned. This permits selection and feeding of copy paper which is suited to the size. Easily available as such a channel sensor is one conventionally used for blip marks B.

Figure 14:
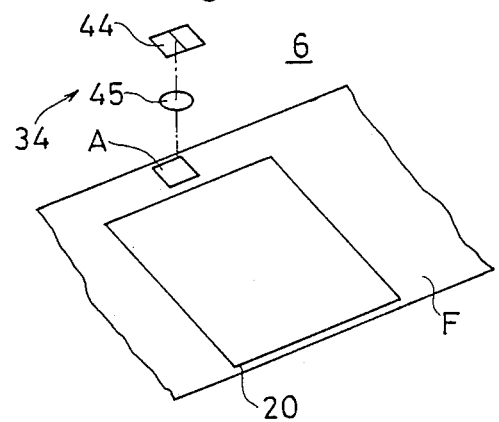
FIG. 14 is a fragmentary perspective view showing the interior of a camera head incorporating a marking assembly, as a modification of the first embodiment.

FIG. 14 shows a modification of the first embodiment of the invention, in which a marking assembly 134 is incorporated in the camera head 6. The marking assembly 134 comprises, a member 44 having a light-emitting surface which is divided into two areas and adapted to project light through a lens 45 onto a film F from behind in the vicinity of a film image P. In this arrangement, a mask or the like is provided between the marking assembly 134 and the aperture 20 for shielding each from the light from the other.

FIGS. 15 to 20 show another embodiment of the invention which is adapted to feed a multiplicity of documents one by one onto a document table for an automatic photographing operation.

Figure 15:
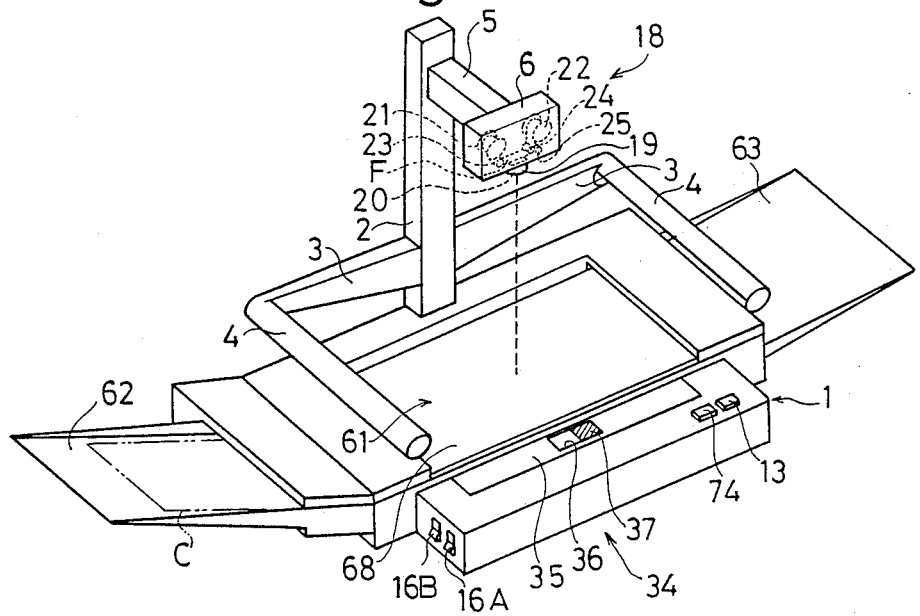
FIG. 15 is an overall perspective view showing another microfilm camera, i.e., a second embodiment of the invention.
Figure 16:
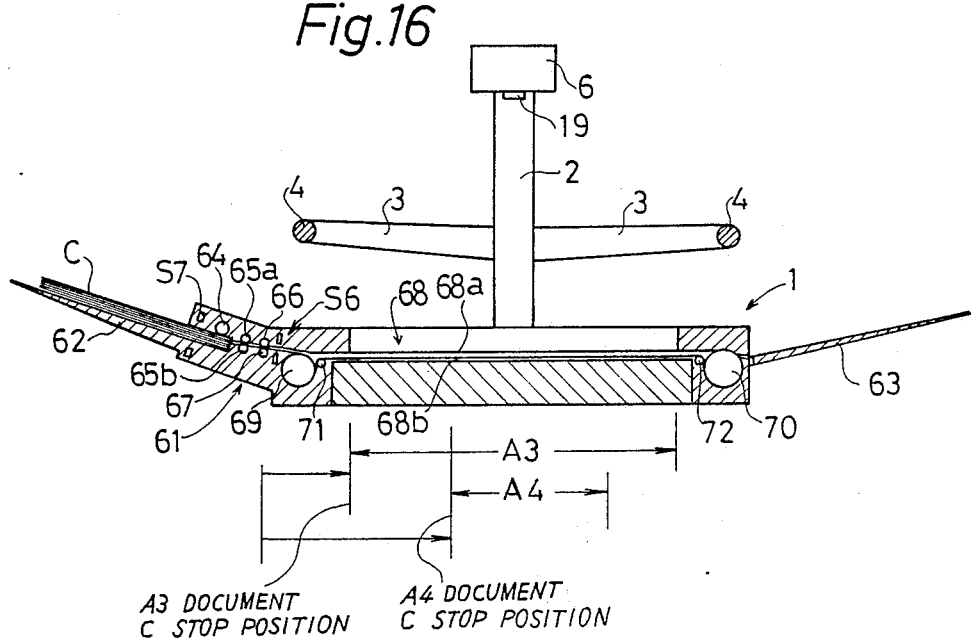
FIG. 16 is a view in vertical section showing the camera of FIG. 15.

With reference to FIGS. 15 and 16, a base 1 is provided with an automatic document feeder 61 instead of the document table of the first embodiment. By the automatic feeder 61, each of documents C on a document tray 62 provided at the left side of the base 1 is fed to a specified position on the base 1, then temporarily held at rest in this position and thereafter delivered onto a discharge tray 63 at the right side of the base 1.

The automatic document feeder 61 comprises a dispenser roller 64 drivingly rotatable by a drive source (not shown) and pressed against the stack of documents C on the tray 62 from above, a pair of upper and lower separating rollers, 65a, 65b for permitting only one sheet of document C to be sent out by the dispenser roller 64 at a time, a feed roller 66 drivingly rotatable by a drive source (not shown) for further transporting the single sheet of document C forwarded by the separating rollers 65a, 65b, an auxiliary roller 67 in pressing contact with the feed roller 66, and a conveyor belt 68 having the following construction.

The conveyor belt 68 is provided around a driven roller 69 and a drive roller 70 provided at opposite sides of the base 1 so as to travel over the base 1. The document C delivered to the belt 68 is thereby transported toward the discharge tray 63 while being attracted to the belt 68 by the action of air suction means provided on the rear side of the belt. During the travel on the belt 68, the document is temporarily stopped. For transporting the document as attached to the belt 68, the belt 68 is made suitably permeable to air by being formed with a large number of holes. When the conveyor belt 68 is at rest, the upper-side portion 68a thereof serves as a document table for the camera to photograph the document C stopped during transport.

Guide rollers 71, 72 act on the conveyor belt 68 in the vicinity of the driven roller 69 and the drive roller 70, respectively, to hold the lower-side portion 68b of the belt raised toward the upper-side portion 68a between the two rollers 69 and 70.

According to the present embodiment, the travel of the conveyor belt 68 is so controlled that when the document of A3 size or A4 size is stopped at the fed position immediately above the base 1, the document is centered with respect to the camera head. Accordingly, the A3 and A4 documents differ in their rear end positions when thus held at rest at the fed position as seen in FIG. 16. Nevertheless, this mode of positioning is not limitative. For example, documents of different sizes can be positioned at rest above the base 1, with their front edges or rear edges located at a definite position.

At one side of the feed roller 66 which side is closer to the conveyor belt 68, a sensor S6 is disposed for detecting the front and rear edges of the document C when it is delivered from the feed roller 66 onto the conveyor belt 68. The sensor S6 is of the transmission type comprising a pair of a light-emitting element, such as an LED, and a photodetector, such as a photodiode, opposed to each other across the path of transport of the document C. Alternatively, a sensor of the reflection type is of course usable. The feed roller 66, which is driven at a specified speed, is equipped with a pulse generator 73 (FIG. 17), such as an encoder, as mounted on the same shaft as the roller 66. Accordingly, the pulse generator produces pulses corresponding to the amount of feed of the document C.

The size of the document C fed to the base 1 and a reference position for stopping the document C at the specified position are detected based on the document edge detecting signals from the sensor S6 and also on the pulse signal produced by the generator 73 and corresponding to the amount of feed of the document C.

The document tray 62 is provided with a sensor S7 for detecting the presence or absence of a document C thereon. The sensor S7 also comprises a pair of a light-emitting element and a photodetector.

In place of the different size buttons used in the first embodiment, a single operation button 74 is provided in the present embodiment since the size of the documents C is automatically detectable.

Figure 17:
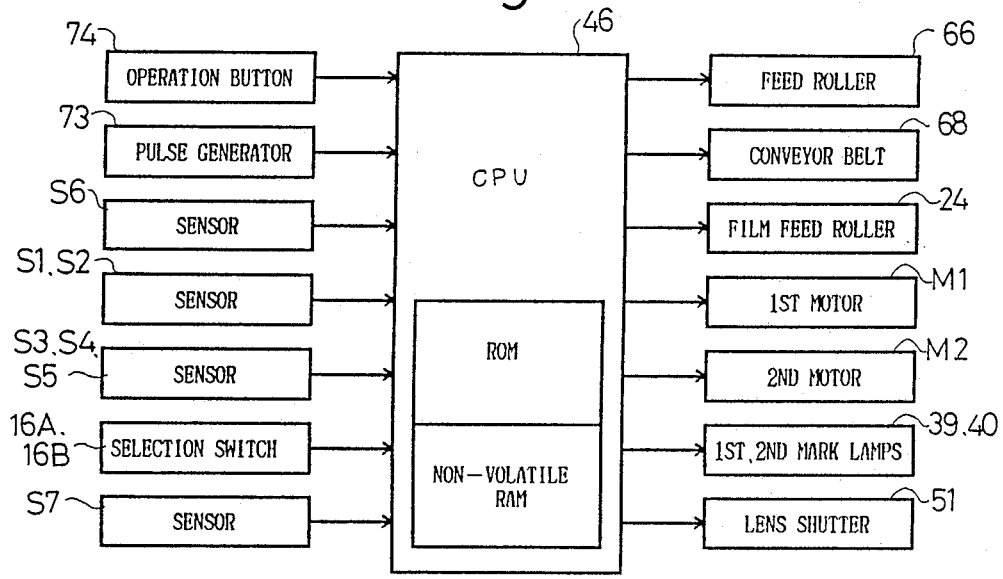
FIG. 17 is a wiring block diagram showing the control means of the second embodiment.

With reference to FIG. 17, a microcomputer 46 serving as the operation control means of the present embodiment has connected to input ports thereof the operation button 74 in place of the size buttons of the first embodiment, and the pulse generator 73 and the sensors S6, S7 which are additionally provided in the present embodiment. The feed roller 66 and the conveyor belt 68 which are additionally incorporated in the second embodiment are also coupled to output ports of the microcomputer 46.

With the exception of the features described above, the second embodiment has the same construction as the first.

The process for controlling the operation of the present embodiment will be described with reference to the flow charts of FIGS. 18 to 20.

Figure 18:
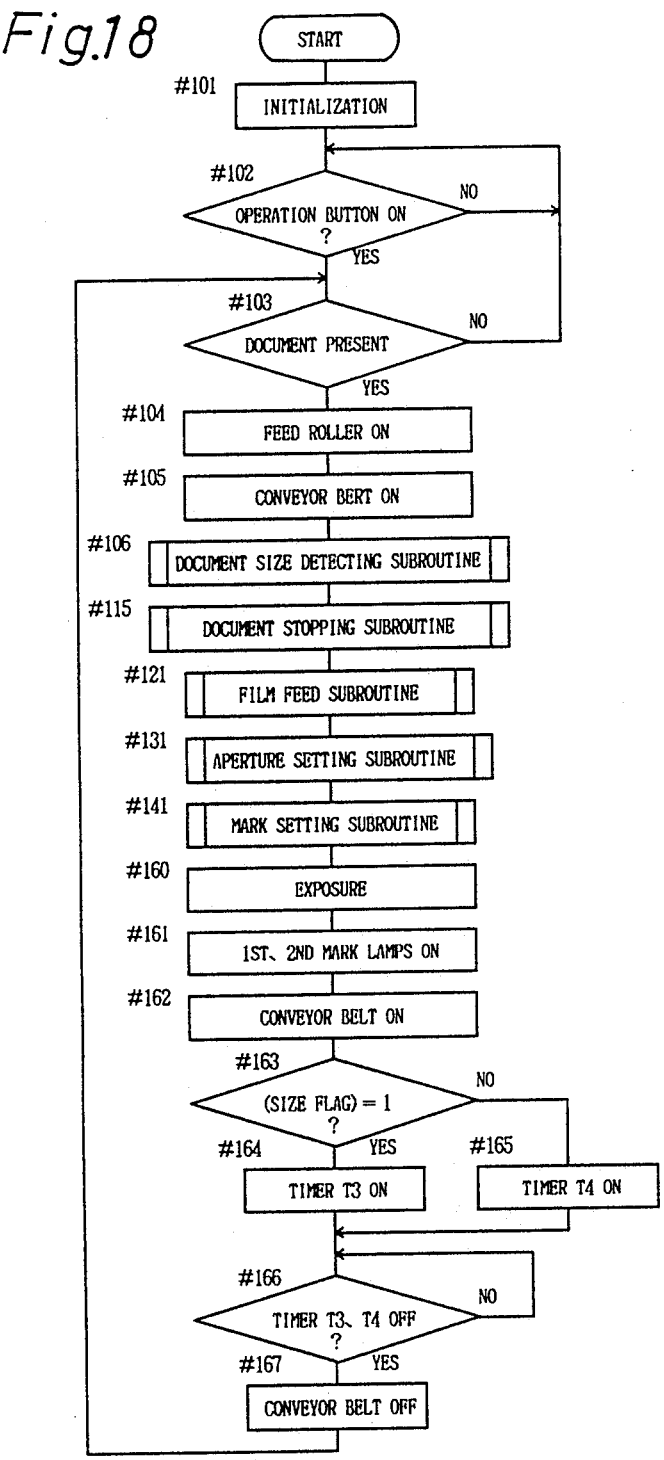
FIG. 18 is a main flow chart showing the operation control process to be executed by the control means of FIG. 17.
Figure 19:
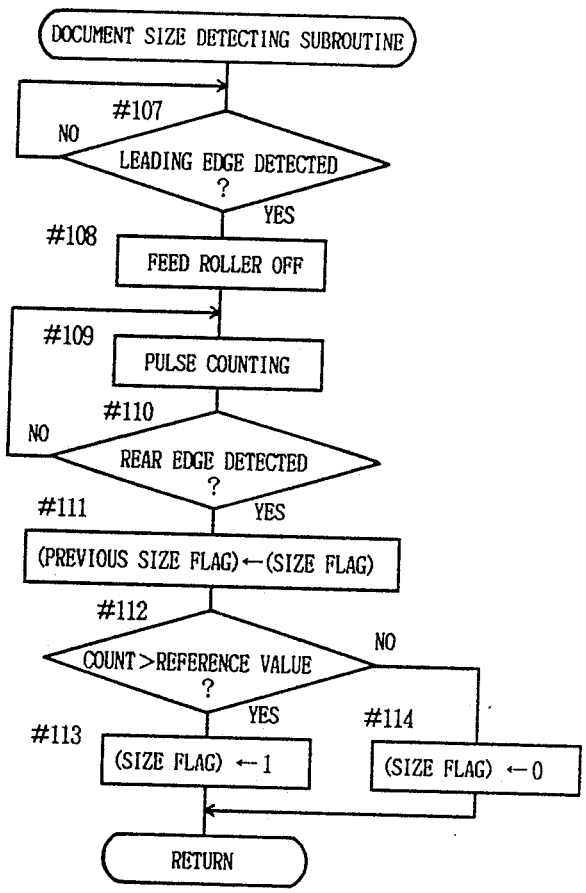
FIG. 19 is a flow chart showing the document size judging subroutine of FIG. 18.

FIG. 18 shows the main control routine.

The initialization of step 101 includes the initialization of the microcomputer 46 and resetting of various flags. Subsequently, step 102 checks whether the operation button 74 is on. If it is on, step 103 follows, in which presence or absence of documents C on the tray 62 is detected from the signal from the sensor S7. The tray 62 is thus checked for the presence of documents C until no document remains on the tray 62. When no document C is detected, the sequence returns to step 102. In the subsequent steps 104 and 105, the feed roller 66 and the conveyor belt 68 are actuated, the dispenser roller 64 is also operated, and the separating rollers 65a and 65b function. Thus, the automatic feeder 61 operates, whereby only one sheet of document C is sent from the document tray 62 onto the conveyor belt 68, which further forwards the sheet.

Step 106 therefore detects the size of the document C. FIG. 19 shows the document size detecting subroutine.

In this subroutine, step 107 first checks whether the leading edge of the document C fed by the automatic feeder 61 is detected by the sensor S6. If it is detected, the feed roller 66 is turned off in step 108 along with the dispenser roller 64. In step 109, pulses are counted in corresponding relation to the amount of feed of the document C given by the pulse generator 73, until the rear edge of the document C is detected in the next step 110. The count provides the amount of feed of the document C during the passage of the document C through the sensor S6, i.e., the size of the document C. Upon the sensor S6 detecting the rear edge of the document C in step 110, the existing size flag is stored in the nonvolatile RAM as the previous size flag, while a new current size flag is set in step 111. In step 112, the count obtained by step 109 is compared with a predetermined reference value. When the count is greater than the reference value and is interpreted as indicating A3 size, the status of the corresponding size flag is set to 1 in step 113. Conversely, if the count is found to be smaller than the reference value to represent A4 size, the status of the corresponding size flag is set to 0 in step 114.

Figure 20:
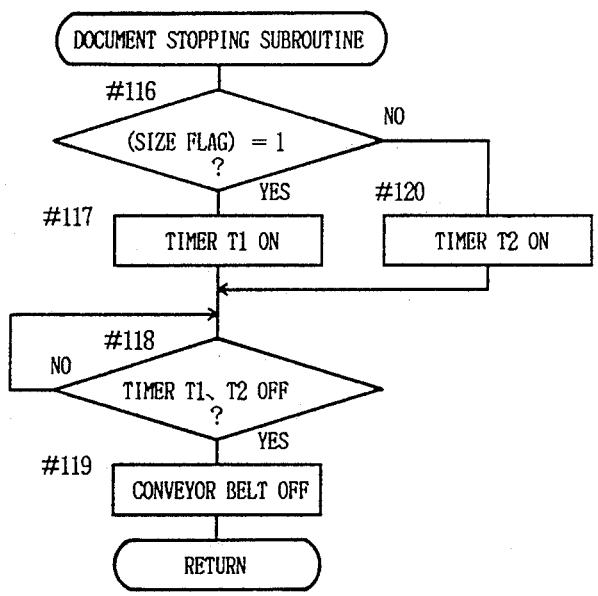
FIG. 20 is a flow chart showing the document stopping subroutine of FIG. 18.

With reference to FIG. 18 again, the document C being transported by the feeder 61 is stopped so as to be positioned centrally of the base 1 according to the document size detected (step 115), as illustrated in the document stopping subroutine of FIG. 20 in detail.

In step 116, the size flag is checked as to whether the status is 1. If it is 1, indicating that the size of the document C is A3, step 117 initiates a timer T1 for A3 into operation. Upon lapse of a preset time interval from the detection of the rear edge by the sensor S6 in step 110, the timer T1 ceases its operation in step 118. Consequently, the traveling conveyor belt 68 is brought to a halt in step 119.

If step 116 reveals that the status of the size flag is not 1 but 0, indicating that the size of the document C is A4, step 120 brings a timer T2 for A4 into operation. Upon lapse of a preset period of time, the timer T2 is brought out of operation in step 118. The conveyor belt 68 is stopped in step 119. In this way, the document is transported on the conveyor belt 68 by a sepcified amount in accordance with its size and stopped in position as indicated in broken lines in FIG. 16.

Subsequently, the same subroutines as in the case of the first embodiment are executed since the previous document size and the current document size are apparent. With reference to the main routine of FIG. 18, these subroutines are the film feed subroutine of step 121, the aperture setting subroutine of step 131, and the mark setting subroutine of step 141, which are executed in sequence to make the camera ready to photograph the document. In step 160, the film is exposed to image light and to the light from the mark lamp(s), whereby the document and the mark are photographed. Step 161 turns off the mark lamp(s), completing the photographing and marking operation.

Since the document C is automatically handled according to the present embodiment, step 162 then brings the conveyor belt 68 into operation again. Depending on whether the size flag is 1 or not as detected by step 163, the step 164 or 165 and step 166 follow for the operation of a timer T3 or T4 for a preset time interval, causing the belt 68 to transport the document C by a predetermined amount to deliver the photographed document C onto the discharge tray 63. The belt 68 is halted in step 167.

The sequence then returns to step 103 to subsequently feed another document C.

The modification of the first embodiment already described with reference to FIG. 13 is usable also as a modification of the second embodiment.

While this invention has been illustrated and is described in accordance with preferred embodiments, it is recognized that variations and changes may be made therein without departing from the invention as set forth in the claims.

What is claimed is:

1. A microfilm camera for photographing images of documents on a film on a reduced scale, comprising:
    a document table for placing the document thereon;
    optical means for projecting an image of the document placed on the document table onto the film by reduction in scale to photograph the image thereon;
    restricting means positioned in the optical path of said optical means for restricting an area on the film to be exposed to light by the optical means, said restricting means being capable of varying the area;
    forming means for forming variable size marks indicative of the size of the photographed image, on the film, in the vicinity of each film image photographed;
    input means for inputting the size of the area which is to be restricted by said restricting means; and
    control means for controlling the restricting means and the forming means with a predetermined relationship to each other to vary the restricted area and the size mark corresponding to the size inputted by said input means.

2. A camera as defined in claim 1, wherein the restricting means has a movable light blocking member positioned in the optical path of the optical means between the document table and the film.

3. A camera as defined in claim 2, wherein the input means comprises a manually operable key input member.

4. A camera as defined in claim 2, wherein the input means comprises means for detecting the size of the document placed on the document table and for inputting the size of the restricted area based on the size detected by the detecting means.

5. A microfilm camera for photographing images of documents on a film on a reduced scale, comprising:
   a document table for placing the document thereon;
   optical means for projecting an image of the document placed on the document table onto the film by reduction in scale to photograph the image thereon;
   means for detecting the size of the document placed on the document table; and
   means for forming an image size mark, based on the size of the document detected by the detecting means, on the film in the vicinity of each image photographed thereon, said image size mark indicating the detected document size.

6. A camera as defined in claim 5, further comprising document feed means for feeding documents one by one onto the document table, the detecting means being operable to detect the size of each document when the document is fed by the feed means.

7. A camera as defined in claim 6, further comprising:
   restricting means positioned in the optical path of the optical means for restricting the area on the film to be exposed to light by the optical means; and
   means for varying the size of the exposure area restricted by the restricting means in accordance with the document size detected by the detecting means.

8. A microfilm camera for photographing images of documents on a film on a reduced scale, comprising:
   a document table for placing the document thereon;
   displaying means mounted on the document table for optically displaying an image size mark corresponding to the size of the document in the vicinity of the document on the table; and
   optical means for projecting the document image on the table and the size mark on the reduced scale to photograph the document image and the size mark at the same time.

9. A camera as defined in claim 8, further comprising:
   input means for inputting the size of the document;
   restricting means positioned in the optical path of the optical means between the document table and the film for restricting the area on the film to be exposed to light by optical means; and
   means for varying the size of the exposure area restricted by the restricting means in accordance with the document size specified by the specifying means.

10. A camera as defined in claim 9, wherein the input means comprises a manually operable key input member.

11. A camera as defined in claim 10, wherein the input means comprises sensor means for detecting the document size.

* * * * *